United States Patent [19]

Dechavanne

[11] 4,165,959
[45] Aug. 28, 1979

[54] APPARATUS FOR INJECTION-MOULDING SEVERAL MOULDING MATERIALS ONTO ONE ANOTHER

[76] Inventor: Jacques Dechavanne, 9 Chemin de Gua, Sassenage (Isere), France

[21] Appl. No.: 878,868

[22] Filed: Feb. 17, 1978

[30] Foreign Application Priority Data

Feb. 25, 1977 [FR] France ............................... 77 06335

[51] Int. Cl.² .......................... B29F 1/00; B29C 5/00
[52] U.S. Cl. .................................. 425/130; 425/542; 425/556; 425/574
[58] Field of Search ............... 264/255, 328; 425/130, 425/129 R, 134, 542, 572, 573, 574, 575, 576, 588, 589, 556

[56] References Cited

U.S. PATENT DOCUMENTS

| 2,333,059 | 10/1943 | Tucker | 264/247 |
|---|---|---|---|
| 2,528,509 | 11/1950 | Goodrich | 425/134 |
| 3,482,284 | 12/1969 | Rees | 425/130 |
| 3,492,696 | 2/1970 | Haller | 425/575 |
| 3,807,920 | 4/1974 | Aoki | 425/130 |
| 3,850,562 | 11/1974 | Takeuchi et al. | 425/543 |
| 3,914,081 | 10/1975 | Aoki | 425/130 |

Primary Examiner—W. E. Hoag
Attorney, Agent, or Firm—Karl F. Ross

[57] ABSTRACT

The invention provides a universal hydraulic press for injection-moulding where two separate clamping units, each with a respective mould, are arranged in parallel and are adapted to be brought into alternate engagement with each of two injection units in which a different moulding material may be housed. One of the moulding materials may be injected into one of the moulds following which indexing movement brings the other injection unit into register with that mould for injecting the second material onto the first.

10 Claims, 3 Drawing Figures

APPARATUS FOR INJECTION-MOULDING SEVERAL MOULDING MATERIALS ONTO ONE ANOTHER

The present invention relates to a universal hydraulic press for injection-moulding several moulding materials together, which makes it possible to produce articles, in a single piece, which are formed from several different thermoplastic, thermosetting or elastomeric moulding materials.

To produce such articles, the conventional process for moulding different materials onto one another requires at least two moulds for one and the same article. In the case, taken here by way of an example, of a gasket formed of a central core and two anti-extrusion rings, it is necessary to provide (a) a first tool for moulding the anti-extrusion rings, which are then extracted, removed and stored, and (b) a second tool for subsequently producing the central core while the previously moulded anti-extrusion rings are introduced manually, as inserts.

At each operation, there is a danger of damaging the article during extraction, during various handling operations, during storage, and when forcing into position in the second tool. Furthermore, the resulting manufacturing cycle of this process is very long and hence expensive.

Other known systems use two Archimedes screws which make it possible to inject two materials simultaneously into one and the same mould which is of very complicated construction. Using this process is extremely expensive from the point of view of providing the machine and, even more so, the mould.

The present invention proposes to overcome these disadvantages.

According to the present invention, there is provided apparatus for injection-moulding several moulding materials onto one another, comprising at least two parallel and independent clamping units each having a mould and its sprue block; and at least two injection units, mounted on a common support, the arrangement being such that relative rotary movement between the injection units and clamping units is possible, each said injection unit being adapted to be brought into co-operation with any of the clamping units and to inject through said sprue block of that clamping unit a moulding material which may be different from that of the other injection unit or units.

The invention also provides a process for moulding several different materials onto one another comprising taking the apparatus just described above, injecting one of said materials from one of said injection units into one of said moulds with a filler member partially filling said mould, indexing the apparatus to bring the mould and another of said injection units into co-operation without said filler member in place and injecting a different moulding material into said mould onto the first material already in said mould, and stripping the composite injection moulded article from said mould.

The relative movement between the injection units and the moulds are synchronised with the actuation of the clamping units so as to inject successively, into each of the moulds, the various materials required for the production of composite articles to be obtained, all these materials being introduced through the same sprue block.

By allowing the moulding of the whole of the article to take place in one and the same mould, the apparatus according to the invention eliminates numerous operations and considerably reduces the duration of a manufacturing cycle, thus making it possible greatly to reduce the cost of articles produced by moulding materials onto one another. Furthermore, the proportion of articles which needs to be scrapped is virtually zero, and not only is the quality of the articles constant since the entirely automatically controlled manufacturing cycle is always the same, but furthermore the quality is very high since the articles moulded from a first material remain in position in the cavity of the mould for a very short time and undergo a second shaping operation when a second material is moulded onto the articles whilst the first material is still hot.

Preferably the apparatus comprises just two parallel clamping units and two diametrically opposite injection units, grouped on a turret which is able to rotate about an axis located between and parallel to the two clamping units, each injection unit being able to receive in its hopper a moulding material different from that of the other injection unit, and being able to come into a position facing one or other of the two clamping units by virtue of a 180° rotation of the turret so as to make it possible to produce articles formed from two materials in one and the same mould.

For each stopping position of the rotation of the turret, one of the injection units feeds one of the moulds with a first material, whilst the second injection unit feeds the other mould with a second material, which makes it possible to start the manufacture of one article in one clamping unit whilst the second material is being moulded onto an article in the other clamping unit. After rotation of the turret through 180°, and ejection of the finished article from the second clamping unit, the manufacture of a new article commences in this unit whilst the moulding of the second material onto the first takes place in the first unit, and so on, the operation alternating between the two clamping units and being able to continue indefinitely in this way.

Each injection unit must be applied against the sprue block of the mould located opposite the injection unit so as to effect the injection of material, and be retracted from the clamping unit opposite which it is located in order to allow the turret with the two injection units to rotate. Advantageously the turret carries, for this purpose, two frames, and means for slidably guiding them for motion, parallel to the axis of rotation of the turret, each frame carrying one of the injection units, a jack associated with each frame making it possible to bring the injection unit, towards or away from the corresponding clamping unit opposite which it has been brought.

To make it possible to mould a first part of each article and then to mould the remainder of the article onto this first part, in the same mould, it is desirable to provide a movable plate inserted between the two mould parts of each clamping unit, the plate having two cavities with specific profiles and being associated with means which make it possible to shift the said plate synchronously with the rotational movement of the two injection units, so as to bring the first cavity between the two mould parts for moulding the first material and the second cavity between the two mould parts for moulding the second material.

In a particular embodiment applicable to the production of hydraulic gaskets formed from a central sealing core made from a first material and two anti-extrusion rings made from a second material, the abovementioned movable plate comprises two cavities of circular shape, the first cavity having a profile such that it fills the space corresponding to the central core of the gasket so as to make it possible in a first stage to mould the two anti-extrusion rings, and the second cavity being in the form of a circular hole which simply has an edge delimited by two oppositely tapering frusto-conical surfaces, ensuring the precise alignment of the two mould parts for moulding in a second stage the central core in the space remaining between the two anti-extrusion rings which have already been moulded.

It should be noted that if this movable plate is suitably constructed and positioned, it can also serve to tear off the sprues of the sprue block of the corresponding mould, and to eject the finished article.

In order that the present invention may be better understood the following description is given, merely by way of example, with reference to the accompanying schematic drawings which show one embodiment of a universal hydraulic press in accordance with the invention for injection-moulding several materials onto one another.

Figure 1:
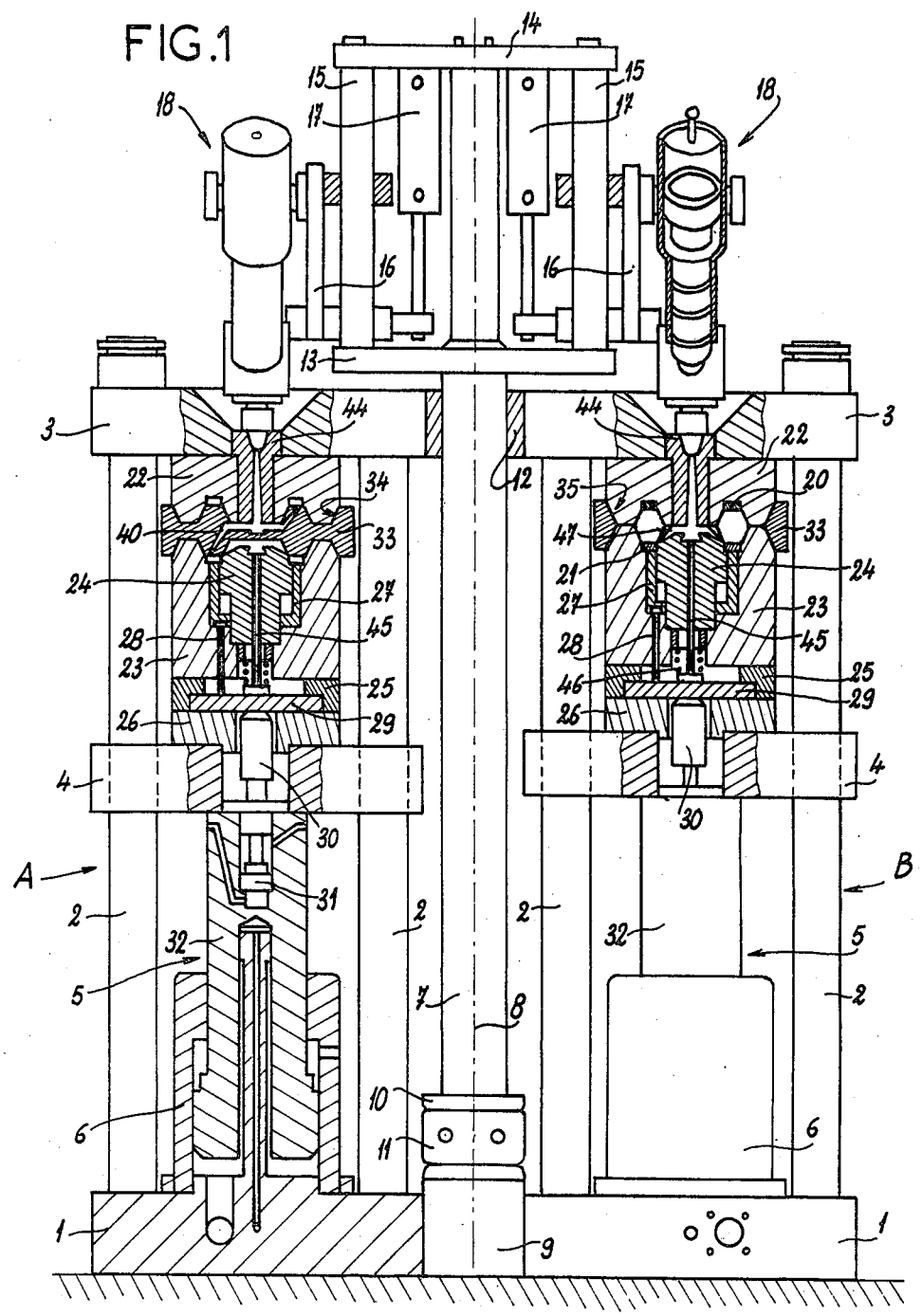
FIG. 1 is an overall view, with partial cross-sections, showing a press according to the invention, of a vertical type.

The following description applies to a press of the vertical type, comprising two identical clamping units A and B. A double baseplate 1 is connected, via eight vertical columns 2, to an upper fixed double platen 3. On each group of four columns 2 is slidingly mounted a movable platen 4 which can be shifted vertically by means of a closing ram 5 of which the body 6 is firmly fixed to the baseplate 1.

Between the two clamping units A and B is located a turret 7 which can undergo rotational movement about its vertical axis 8. A central base 9 supports a thrust bearing 10 on which is mounted the turret 7. The thrust bearing 10 rests on the base 9 via a rotary hydraulic jack 11 which can bring about alternating rotational displacement through 180°. However, the rotation of the turret 7 in the thrust bearing 10 can also be effected by means of an ordinary hydraulic ram, the extending movement of which is converted to a rotational movement via a crank firmly fixed to the turret 7, or by any other rotational drive means, such as a step-down gearing system.

To the upper part of the turret 7, above a bearing 12 located at the level of the fixed platens 3, are fixed two supports 13 and 14 between which are clamped four vertical guide columns 15. These columns 15 slidingly support two diametrically opposite frameworks 16, which can be caused to undergo, independently of one another, a vertical reciprocating movement by means of respective separate hydraulic rams 17.

Each framework 16 supports a universal injection unit 18, which will be of a type appropriate for the moulding materials and which can be constructed with two screw plungers in accordance with my French patent application No. 77.06322.

Figure 3:
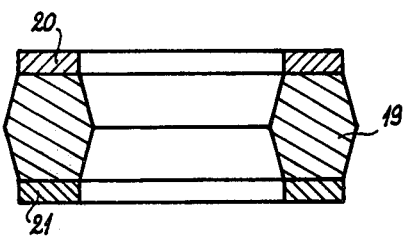
FIG. 3 shows, in cross-section a hydraulic gasket which can be produced with the aid of the press shown in the preceding Figures.

Each of the clamping units A and B comprises a mould, which in the embodiment shown permits the manufacture of a hydraulic gasket formed from three parts. Such a gasket is shown in FIG. 3 and is one wherein the relatively soft central sealing core 19 must be protected against the danger of extrusion under high pressures by two very hard anti-extrusion rings 20 and 21, moulded onto the core so as to form therewith a single-piece gasket whose three parts are inseparable.

In the example considered, it has been assumed that the two moulds are interchangeable, but for long runs the fixed platens 3 and movable platens 4 can constitute master moulds into which are inserted elements such as liners having the precise profile of the article to be produced.

Each mould essentially comprises an upper part 22 which is machined to the contour of the upper half-shape of the gasket to be moulded, a lower part 23 which is machined to the contour of the lower peripheral part of the gasket, and a central core 24 which shapes the lower central part of the gasket. The upper mould part 22 is fixed underneath the fixed platen 3. The lower part 23 is mounted, via spacers 25, on a baseplate 26 centered on the movable platen 4. The core 24 is located in a central recess of the lower part 23, which both encloses and fixes it.

The moulds shown furthermore comprise a movable ejection sleeve 27, inserted into the above-mentioned central recess, between the mould part 23 and the central core 24. This sleeve 27, which defines the lower annular face of the gasket to be moulded, is vertically displaceable relative to the lower part 23 of the mould, by means of ejectors 28 slidingly mounted in the said part 23. The ejectors 28 are themselves moved by an ejection plate 29, guided in the spacers 25 and normally resting on the baseplate 26. Ejection is triggered by sliding through the movable platen 4, of a striker tip 30, of an auxiliary hydraulic piston 31 enclosed within the piston rod 32 of the closing ram 5.

Figure 2:
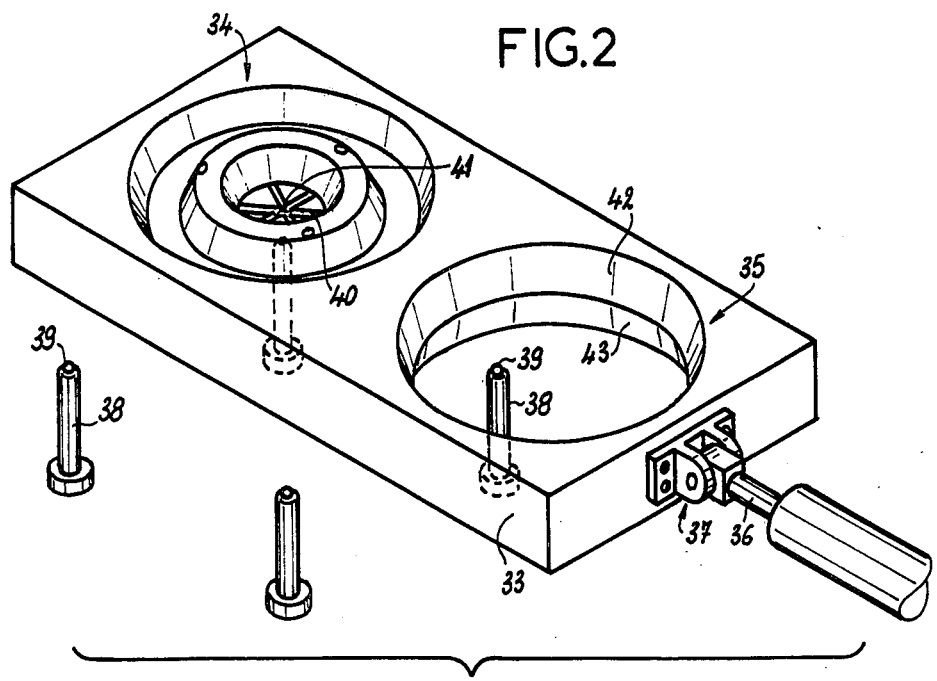
FIG. 2 is a view of a small part of this press, in exploded perspective, showing in particular the movable plate comprising the cavities.

Between the two mould parts 22 and 23 of each mould, which are constructed in a conventional manner, is inserted a special horizontal movable plate 33 referred to as a "spectacle frame" in which are machined two cavities in the form of circular cavities 34 and 35, having specific profiles clearly visible in FIG. 2. These spectacle frames 33 are shifted along parallel directions at right angles to the plane of the paper in FIG. 1, by means of substantially horizontal rams 36, the piston rod of each of which is hinged to the respective spectacle frame 33 via a clevis 37 fixed to one end of the spectacle frame. The lower face of each spectacle frame 33 can rest on four fixed feet 38 the head of each of which accommodates a bearing ball 39.

The first circular cavity 34 of each spectacle frame 33 is that through which the plane of section of the left-hand mould of FIG. 1 passes. The profile of this cavity 34 is such that its floor fills the cavity which the relatively soft central sealing core 19 of the gasket to be moulded is intended to occupy. Several channels 40 start at the center of this profile and extend in radial directions to terminate in injection points of which some are located on the upper face of the spectacle frame 33 and some on the lower face of that spectacle frame. In addition, the centre of the profile in question comprises a sprue retention device 41.

The second circular cavity 35 of the spectacle frame 33 is a hole which simply has an edge delimited by two oppositely tapering frusto-conical surfaces 42 and 43.

Each of the two moulds is fed from a respective single sprue block 44, which passes vertically through the upper part 22 of that mould, and each mould further comprises a central ejector 45 mounted so as to slide vertically in the core 24 and spring urged downwardly onto the ejection plate 29 by a compression spring 46.

An operating cycle takes place as follows, starting from the position shown in FIG. 1 and considering the events occurring on the left hand side of FIG. 1, i.e., at the clamping unit A.

Initially, the mould of this clamping unit A is closed onto the spectacle frame 33, which is so positioned that its recess 34 is between the upper mould part 22 and lower mould part 23, the geometrical centre of the profile of the said cavity being in line with the channel of the sprue block 44. As has already been indicated, the cavity which the central sealing core 19 of the gasket is intended to occupy is in this position of the spectacle frame 33, filled by the spectacle frame and the only free spaces which thus remain inside the mould are two annular cavities corresponding to the two anti-extrusion rings 20 and 21 of the finished gasket.

In this initial position, the channels 40, arranged in a star-shaped manner, feed the two abovementioned annular cavities to mould the anti-extrusion rings, as the injection unit 18 brought above the clamping unit A fills these two cavities without difficulty with a first moulding material introduced into its hopper, which hopper is not shown.

At the end of the injection cycle of this first material, which takes place in a known manner, and after cooling of the injected material, the piston rod 32 of the closing ram 5 is lowered to open the mould.

In a first stage of the downward travel of the movable platen 4, the spectacle frame 33 follows the movement of the lower mould part 23 and thus causes the injection gates of the upper anti-extrusion ring 20 to break. This ring 20 remains in the corresponding cavity because there is no ejection device provided in the upper mould part; the shrinkage of the material locks this anti-extrusion ring around the central core of the upper part 22. At the same time, the sprue of the sprue block 44 becomes torn off and remains attached to the profile of the cavity 34, by virtue of the retaining device 41.

At the end of the first stage of downward movement, when the mould is sufficiently open, the spectacle frame 33 abuts the balls 39 of the feet 38. Further downward movement of the movable platen 4 causes the injection gates of the lower anti-extrusion ring 21 to break although this ring remains in the corresponding cavity because the ejection ram 31 is not actuated.

The spectacle frame 33, now resting on the balls 39, is free for movement in a horizontal plane. The ram 36 is actuated so as to move until the second cavity 35 is aligned with the mould, between its upper mould part 22 and the lower mould part 23. The first cavity 34 is thus outside the enclosed zone of the press and since it does not have any means of ejection, it still carries the main sprue originating from the channel of the sprue block 44 and the attached sprues from the runners 40. It is thus easy for the operator to detach these sprues manually.

At the same time, after the injection units 18 have been raised by means of the rams 17, the rotary jack 11 is actuated so as to rotate the turret 7, and hence the two injection units 18, through 180°.

Thus it is now the other injection unit 18, the hopper of which is filled with a second moulding material different from that in the first, which is brought above the mould of clamping unit A. This second injection unit is then lowered and applied against the sprue block 44 of this mould.

When the cavity 35 of the spectacle frame 33 has been brought into line with the axis of this mould, a signal automatically causes the closing of the clamping unit A, which is thus brought into the position occupied by unit B in FIG. 1.

In this position, because of the profile of the cavity 35, the spectacle frame 33 no longer fills the cavity corresponding to the central core 19 of the gasket to be moulded. The sole purpose of the profile of the cavity 35 is to ensure, as a result of its concavo-convex conical surface 42, 43, that the two mould parts 22 and 23 are aligned precisely.

Still referring to the same clamping unit A now in its new position, the second material, which is intended to fill the cavity remaining free between the two already moulded anti-extrusion rings 20 and 21, is now injected into the same mould and through the same sprue block 44. To fill this cavity, a second set of runners 47 arranged in a star-shaped manner on the upper face of the central core 24 is used. These runners 47 were not used during the first injection when they remained isolated from the channel of the sprue block 44 under the floor of the profile of the cavity 34 of the spectacle frame 33. For the second injection step, described here, the profile of the cavity 35, will ensure that the channels 47 act as an extension of the channel of the sprue block 44 and deliver the second material, by "submarine" injection, into the cavity remaining between the two anti-extrusion rings 20 and 21.

Provided the chemical natures of the two injected material are not incompatible to any significant content, mutual adhesion will occur between the central core 19 of the gasket and the two anti-extrusion rings 20 and 21 when the material of the gasket is hot and under pressure.

At the end of the cycle, after the composite gasket has cooled, the two injection units 18 are raised and whilst these rotate through 180° about the axis 8, the mould is opened as described previously. In a first stage of opening movement the upper part of the gasket is extracted and the sprue from the sprue block 44 is also pulled off by means of a retaining device provided at the point of convergence of the runners 47. After the spectacle frame 33 has abutted the feet 38, the movable platen 4 continues to descend until a certain terminal position of the opening stroke is reached.

At this instant, an appropriate signal will be emitted so as automatically to actuate the ejection ram 31 which when the press is cycling automatically only functions at the end of every alternate opening movement out of two, i.e., after the second stage of the injection moulding of the gasket in that mould. The striker tip 30 is raised and thereby lifts the base plate 26, the ejectors 28, the ejection sleeve 27 and the central ejector 45. The ejector sleeve 27 is raised until it is flush with the upper surface of the lower mould part 23 so that the injection gates corresponding to the second injection operation are cut and the gasket is entirely severed from the two mould parts. At the same time, the central ejector 45 extracts the sprue as well as the tabs originating from the channels 47.

If the downward stroke of the movable platen 4 has been regulated correctly, so that the inner surface of the spectacle frame 33 passes quite close to the upper surface of the lower mould part 23, the return of the said spectacle frame 33 to its initial position under the action of the rams 36 will, without any additional component, provoke ejection of the finished gasket and of the last sprue from out of the enclosed zone of the press. This last sprue can then be severed from the moulded article either manually by the operator or with the aid of an automatic mechanism.

After closing of the mould, the unit A in question is again in its initial position and the above described cycle is repeated in the same way. During this operating cycle, the other clamping unit B will undergo precisely the same process, but out of phase by half a cycle; the cavity 35 of its spectacle frame 33 will be in line with its mould when the cavity 34 of the spectacle frame of the other unit A is in line with the axis of its mould, and one of the materials will be injected into the mould of unit B whilst the other material is being injected into the mould of unit A. A complete gasket is thus produced in each half-cycle by the combination of the two units.

Whilst, in the example considered, it has been assumed that the two clamping units A and B and their moulds are strictly identical, it will readily be seen that gaskets made of the same two material but different in their shapes and/or sizes can be produced simultaneously (but out of phase by half a cycle) on each of the two units (A and B) each gasket being produced with a single tool. It is also possible to provide multi-impression moulds, which make it possible simultaneously to produce a set of gaskets or other articles on each clamping unit A and B.

Given the apparatus of this invention, it is of course also possible, by modifying the automatic control of the press, to prevent the rotation of the two injection units 18 and to cause the apparatus to function as two separate conventional machines, with each injection unit 18 remaining in line with one only of the two clamping units A and B which can then function in completely independent cycles or with similar cycles which may be simultaneous or staggered relative to one another.

In its normal use, the apparatus according to the invention is principally applied to moulding articles from two materials moulded one onto the other, where the transition from one material to the other must take place with neither flash nor mixing. This machine is particularly suitable for moulding multi-component hydraulic gaskets, as in the example described.

Of course, the invention is not limited to the sole embodiment of hydraulic press described above by way of example; on the contrary it embraces all variants thereof falling within the scope of the following claims. Thus, in the case of the vertical press described, it is not only possible to modify the means which control the rotation of the turret 7 about its axis 8 (as has already been indicated) but also to replace the assembly consisting of the supports 13 and 14, the columns 15, the two frameworks 16 and the rams 17 by an equivalent structure, for example by providing a turret which terminates in a ram piston rod and by attaching the two injection units 18 to one and the same framework which is firmly fixed to the cylinder of the ram associated with the said rod.

Whilst still adhering to the same principle of construction and of operation, it is also possible to construct substantially the same assembly on a horizontal axis, though in that case the construction is somewhat more complicated.

Finally, in view of the fact that it is the relative rotational movement of the two injection units with regard to the two clamping units which is important, another possibility consists of keeping the two injection units fixed and of mounting the two clamping units on a turret, so that either one or the other of the clamping units can be presented underneath each of the stationary injection units.

I claim:

1. Apparatus for injection-moulding several moulding materials onto one another, comprising at least two parallel and independent clamping units, a respective mould and sprue block carried by each of said clamping units; at least two injection units for moulding materials; common support means carrying said at least two injection units; means supporting said common support means and said at least two clamping units for permitting relative rotary movement between the injection units and the clamping units and for bringing each said injection unit selectively into co-operation with any of the clamping units for injecting through said sprue block of that clamping unit a moulding material which may be different from that injected by the other injection unit or units.

2. Apparatus for injection-moulding several moulding materials onto one another, comprising rotary turret means; two clamping units each arranged parallel to, and diametrically opposed with respect to, the axis of rotation of said turret means; a respective mould and sprue block carried by each clamping unit; two injection units carried by said turret means and arranged diametrically opposite one another with respect to said axis for selectively coming into co-operation with the said clamping units; and hopper means on each injection unit for receiving a moulding material which may be different from that of the other injection unit whereby 180° rotation of the turret means about its axis will bring each injection unit into co-operation with the other clammping unit so as to make it possible to produce articles formed from two materials in one and the same mould.

3. Apparatus according to claim 2, wherein said turret means carries two frames and means for slidably guiding said two frames for movement parallel to said axis of rotation of the turret means, said two frames each carrying one of said injection units; and including a ram associated with each frame, said ram being arranged to bring the corresponding injection unit towards or away from said clamping unit opposite which it has been brought, by movement of its said frame parallel to the axis of rotation of the turret means.

4. Apparatus according to claim 2, and including a piston rod connected to the turret means; a piston fixed to said piston rod; a ram cylinder slidably receiving said piston; and a frame carried by said ram cylinder; said two injection units being fixed to said frame for movement towards and away from the moulds upon actuation of said ram cylinder and piston.

5. Apparatus according to any one of claims 2 to 4, wherein each mould consists of two mould parts, and a movable plate adapted to be inserted between the two mould parts of each mould, said plate including means defining two cavities with different profiles; and wherein means are provided for shifting said plate synchronously with the rotational movement of said turret means carrying the two injection units so as to bring selectively either a first of said cavities between the two mould parts for moulding the first material and the second cavity between the two mould parts for moulding the second material.

6. Apparatus according to claim 5, wherein the means for shifting the above mentioned plate consists of a jack which is hingedly attached to one end of said plate, and means mounting said plate for movement along the direction of opening and closing of the mould; and wherein stop means are provided to limit the movement of said plate along said direction after a certain stroke during opening of the mould.

7. Apparatus according to claim 6, wherein said stop means comprise fixed feet each said foot having a head and is a bearing ball seated in said head.

8. Apparatus according to claim 5, wherein said mould parts of each mould are shaped to define a gasket formed from a central sealing core to be made from a first material in a first mould region and two anti-extrusion rings to be made from a second material in annular further mould regions; wherein said two cavities are of circular shape, with said first cavity having a profile such that it fills the mould space corresponding to said central core of the gasket so as to make it possible to mould the two anti-extrusion rings in a first stage, and with said second cavity having the form of a circular hole the edge of which is delimited by two oppositely directed frusto-conical surfaces for ensuring the precise alignment of the two mould parts in a second stage for moulding said central core in the space remaining between the two already moulded anti-extrusion rings.

9. Apparatus according to claim 8, wherein said movable plate has two opposed faces and has, at the centre of its first circular cavity, several runners, and a single central sprue retention point from which said runners start, said runners terminating at the two faces of the plate for feeding the two annular further mould regions in which the two anti-extrusion rings are to be moulded.

10. Apparatus according to claim 9, wherein each mould has a central core part opposite said sprue block, and said central core part has a sprue retention point and a second set of runners which diverge from said sprue retention point for feeding the first mould region in which said central core of the gasket is to be moulded.

* * * * *